United States Patent [19]
Diener et al.

[11] 3,746,264
[45] July 17, 1973

[54] BELT FERTILIZER SPREADER
[75] Inventors: Robert G. Diener, Morgentown; Randall C. Reeder, Kenna, both of W. Va.; Harold D. Shoemaker, Uniontown, Pa.
[73] Assignee: Waycrosse, Inc., Minneapolis, Minn.
[22] Filed: Nov. 30, 1971
[21] Appl. No.: 203,146

[52] U.S. Cl. .............................. 239/668, 198/128
[51] Int. Cl. ............................................ A01c 17/00
[58] Field of Search ................... 239/668, 669, 672, 239/664; 198/6, 128; 302/50

[56] References Cited
UNITED STATES PATENTS
3,285,392   11/1966   Wood .................................. 198/128
3,653,951   4/1972    Maldeis et al. ................. 239/672 X
1,080,501   12/1913   Tibyrica ...................... 198/128 UX
2,879,880   3/1959    McGivney ............................. 198/6
3,191,756   6/1965    Paurat ................................ 198/128
3,592,393   7/1971    Sinden .......................... 198/128 X Primary Examiner—M. Henson Wood, Jr.
Assistant Examiner—Michael Mar
Attorney—Frederick E. Lange, David N. Fronek et al.

[57] ABSTRACT

An improved fertilizer spreader having an improved fertilizer projecting means including a pair of pulleys, an endless belt, and a hold down wheel disposed between the pulleys and engaging said belt for imparting inertial movement to the fertilizer particles propelling them outwardly from the spreader, and an improved deflector means having a plurality of deflector fingers disposed at various angles and positioned to intersect the propelled stream of fertilizer particles and deflect portions of the stream in different directions.

13 Claims, 6 Drawing Figures

Patented July 17, 1973

INVENTORS.
Robert G. Diener
Randall C. Reeder
Harold D. Shoemaker
BY David H. Fronek
ATTORNEY Patented July 17, 1973
3,746,264
2 Sheets-Sheet 2
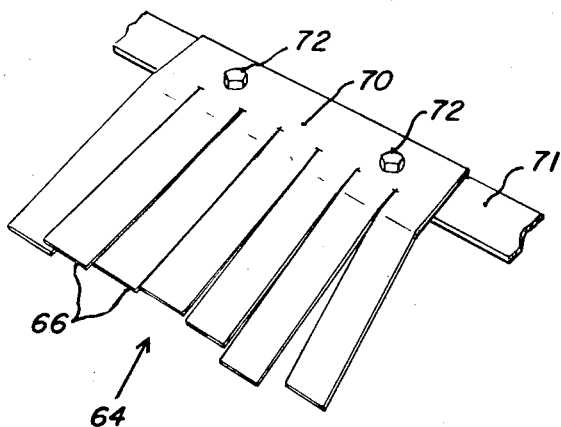
FIG. 3.
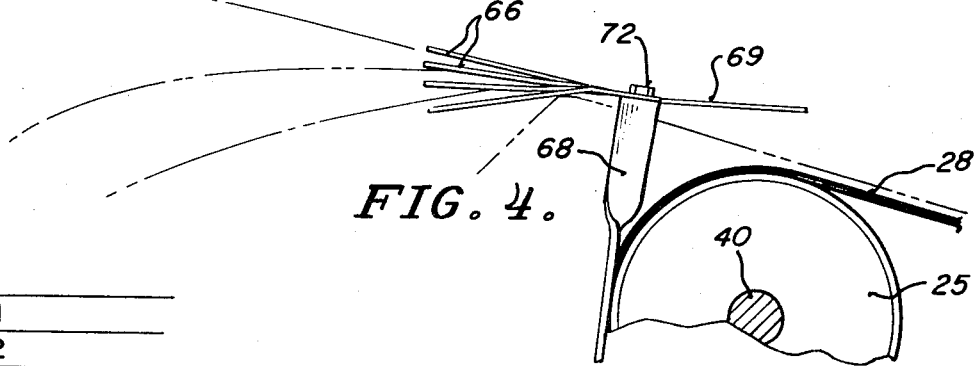
FIG. 4.
| 1 |
|---|
| 2 |
| 3 |
| 4 |
| 5 |
| 6 |
| 7 |
← Fertilizer Flow
FIG. 6.
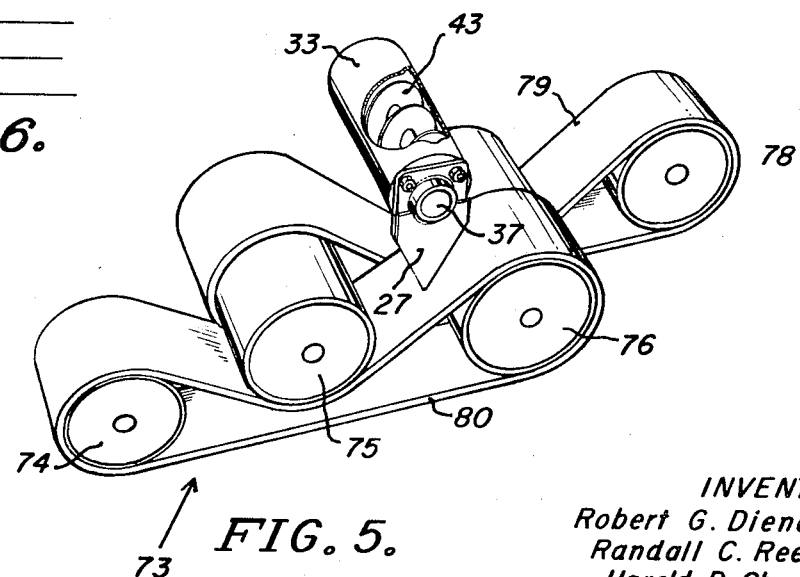
FIG. 5.
INVENTORS.
Robert G. Diener
Randall C. Reeder
Harold D. Shoemaker
BY David N. Fronek
ATTORNEY

BELT FERTILIZER SPREADER

BACKGROUND OF THE INVENTION

The present invention relates generally to an improved fertilizer spreader and more specifically to a fertilizer spreader having an improved means for projecting particulate fertilizer outwardly from said spreader and an improved means for deflecting the projected fertilizer in a uniform distribution pattern.

One of the major problems facing farmers today is maintaining and improving hillside pastures which are normally inaccessible to regular farm tractors and machinery. With proper liming and fertilization, grass production on many of these pastures can be increased by an amount equivalent to a ton of alfalfa hay per acre, representing a substantial economic benefit to the farmer. Although attempts have been made to reclaim or improve this hillside land through conventional aerial or spinner type spreaders, this equipment has been unsatisfactory in terms of cost and uniformly spreading the fertilizer. Consequently, there is a real need for an improved fertilizer spreader capable of competing cost wise with presently existing spreaders and methods of spreading and capable of spreading fertilizer on hillsides with the desired uniformity.

Also, because most of the hillside pastures are not continuous or regular from bottom to crest, but have natural flats or benches separating the steep slopes, a high percentage of the steep pasture land is within 100 to 150 feet of easily accessible, relatively level land. Consequently there is also a need for an improved fertilizer spreader capable of throwing lime and fertilizer long distances with a relative uniform distribution pattern.

Finally, in addition to the need for an improved fertilizer spreader for hillside pastures, a need exists in this country and throughout the world in the level farming areas for improved fertilizing equipment which would reduce the amount of time spent by a farmer in fertilizing his crops. In this respect, a spreader that could spread a swath of fertilizer two or three times wider than present equipment and could throw fertilizer in such volume as to permit higher speeds would provide a substantial economic boost to farmers in areas where timeliness is so important to high yields.

SUMMARY OF THE INVENTION

In contrast to the presently existing fertilizing equipment and methods, the present invention relates to an improved fertilizer spreader capable of spreading fertilizer and lime in a uniform distribution for distances as high as 100 feet. This spreader was developed primarily as a result of recognizing the problems involved in properly fertilizing the relatively steep pasture slopes existing in the state of West Virginia as well as other states and other areas of the world.

More specifically, the present invention includes an improved means for projecting the fertilizer or lime from an implement such as a wagon onto the field and an improved deflector means enabling the projected fertilizer to be evenly distributed over the entire width of the swath. The improved projecting means utilizes an endless belt and a hold down wheel to give the fertilizer instant acceleration thereby enabling the particles of fertilizer to be projected much greater distances than conventional spreading equipment, and the improved deflector means includes a plurality of finger members disposed at a variety of angles to deflect the fertilizer leaving the projecting means in a variety of directions.

Accordingly it is an object of the present invention to provide an improved fertilizer spreader which can be used to economically and properly fertilize the relatively steep slopes of much of the hillside pasture land in this country and throughout the world.

Another object of the present invention is to provide an improved fertilizer spreader capable of projecting particles of fertilizer much greater distances than convention fertilizer spreaders.

Another object of the present invention is to provide an improved fertilizer spreader having an improved deflector means for directing the projected fertilizer in a relatively uniform distribution pattern.

A further object of the present invention is to provide an improved fertilizer spreader capable of uniformly spreading fertilizer over relatively large distances and capable of competing cost wise with conventional spreaders.

These and other objects of the present invention will become apparent with reference to the drawings, the description of the preferred embodiment and to the appended claims.

DESCRIPTION OF THE DRAWINGS

FIG. 3 is a perspective view of the deflector means of the present invention.

FIG. 4 is a plan view of the deflector means mounted to projecting means.

FIG. 5 is a perspective view of an alternative embodiment of the projector means capable of projecting fertilizer in two opposite directions.

FIG. 6 is a schematic view of the deflector means of the present invention with the deflector fingers numbered from 1 to 7.

DESCRIPTION OF THE PREFERRED EMBODIMENT

Figure 1:
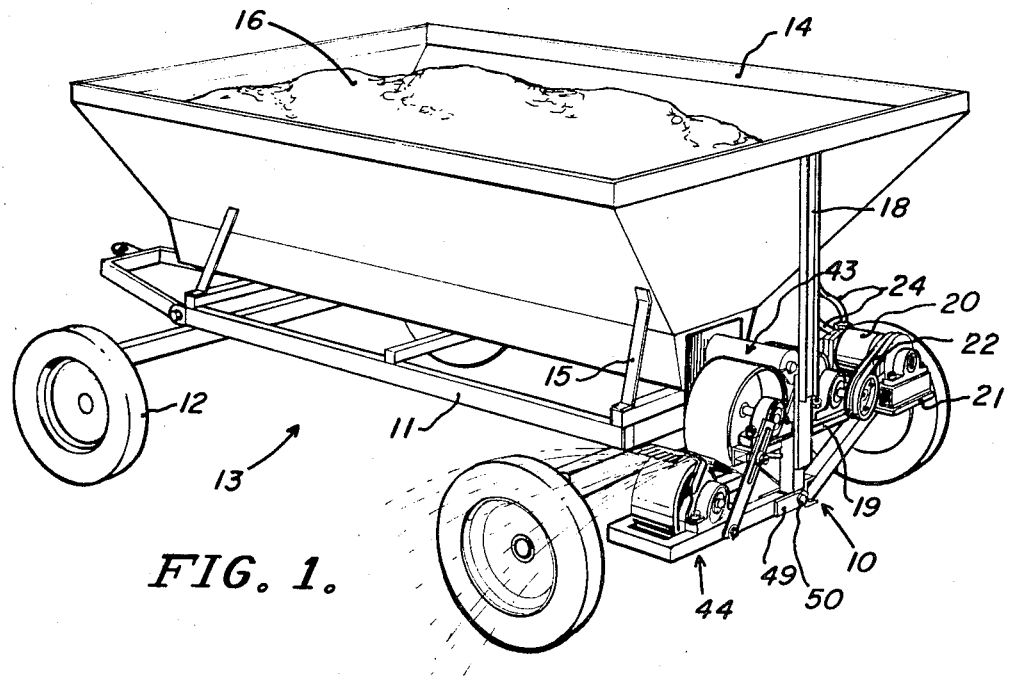
FIG. 1 is a perspective view of the fertilizer spreader of the present invention mounted on a wagon containing the fertilizer to be spread.

Referring first to FIG. 1, the improved fertilizer spreader 10 is shown mounted to the rearward end of a conventional spreader chassis or wagon 13. The chassis 13 includes an undercarriage 11 carried by four wheels 12 and a fertilizer bin 14 supported by the undercarriage 11 and a plurality of braces 15. The chassis 13 is adapted to be connected to and towed by a tractor or other draft means (not shown). Contained within the bin 14 is the fertilizer 16 to be spread by the spreader 10.

The fertilizer spreader 10 is connected to the chassis 13 on one side by an elongate support member 18 extending downwardly from an upper edge of the bin 14 and, although not shown, on the other side by a second support member also secured to the chassis 13. The support members 18 as hereinafter discussed are connected to and support a pulley support bracket 19 which in turn supports a motor mounting platform 21. Mounted on the platform 21 is a motor 20 which is positioned on the platform 21 such that it drives one of the spreader pulleys by a plurality of V-belts 22. Although a variety of different types of motors and engines such as gasoline, hydraulic, diesel, etc. would be acceptable, the motor 20 of the preferred embodiment is a hydraulic motor driven by hydraulic energy obtained from the draft means (not shown) via the hydraulic hoses 24.

Figure 2:
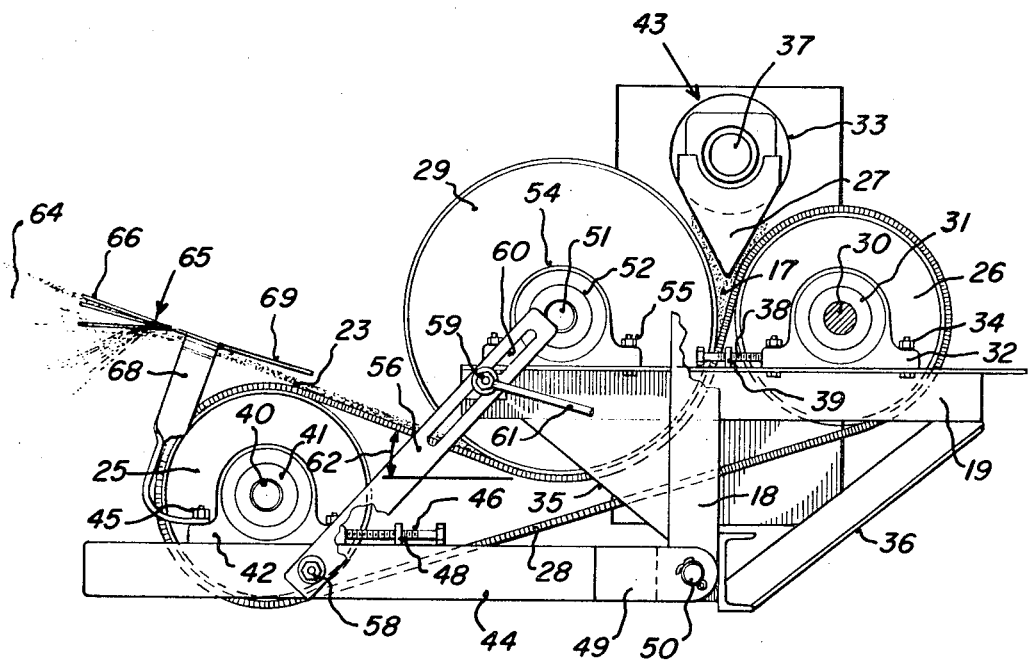
FIG. 2 is a plan view of the fertilizer spreader of the present invention.

Reference is now made to FIG. 2 which is a plan view of the fertilizer spreader 10 without the motor 20. The spreader 10 generally includes a front pulley 25, a rear pulley 26, an endless belt 28 extending between and around the pulleys 25 and 26, and a rotatable hold down wheel or roller 29 disposed between the pulleys 25 and 26 and in a position such that the wheel 29 engages a portion of the belt 28. As will be discussed in more detail below, fertilizer particles are fed by a conveyor means 43 into an area designated by reference numeral 17 between the rear pulley 26 and the wheel 29 where they are accelerated as a result of movement between the wheel 29 and the belt 28. This causes the fertilizer particles to be thrown from the spreader 10 at a considerable velocity. Although the conveyor means may be a chain or belt type conveyor, the means of the preferred embodiment includes a conventional auger 43 comprising an auger shaft 37, an auger housing 33, and a baffle 27.

More specifically, the rear pulley 26 includes a horizontally disposed shaft 30 which is rotatably supported by a pulley bearing 31. The bearing 31 is in turn housed and supported by a pillow block 32 adjustably secured to the pulley support bracket 19 by a pair of conventional machine bolts 34, 34 extending through the block 32 and through an elongated opening in the bracket 19. The support bracket 19 is mounted to and suspended by the support 18 which is securely connected to the fertilizer bin 14 (FIG. 1). The bracket 19 may be connected to the support 18 by any appropriate means such as a plurality of bolts or a weld. In the preferred embodiment the bracket 19 and its corresponding bracket (not shown) on the other side of the spreader 10 is additionally supported with respect to the support 18 and to its corresponding support (not shown) by a pair of triangular braces 35 and a pair of elongate braces 36. A second pillow block corresponding to the pillow block 32 is mounted to the second support bracket on the opposite side of the pulley 26 for supporting a bearing and the other end of the shaft 30, thereby facilitating rotational movement of the pulley 26.

Associated with each of the pillow blocks 32 is a means for adjusting the position and alignment of the pulley 26 including a pulley adjustment screw 38 and an adjustment screw guide 39 rigidly secured to the support bracket 19. The guide 39 contains a hole with internal threads adapted to cooperate with the external threads of the adjustment screw 38. Because of the elongated openings in the support bracket 19 through which the bolts 34 pass to secure the block 32 to the bracket 19, the longitudinal position of the block 32 may be easily adjusted merely by loosening the bolts 34 and rotating the adjustment screw 38 accordingly. It should be noted that a similar adjustment means is associated with the second pillow block corresponding to the block 32. Through the selective adjustment of the longitudinal position of the pillow blocks 32, proper tension in the belt 28 and proper alignment of the pulley 26 with respect to the belt 28 can be obtained. For example, the tension in the belt 28 can be adjusted by adjusting the longitudinal position of each of the pillow blocks 32 so that each of the blocks 32 is moved an equal distance. By adjusting the longitudinal position of only one of the blocks 32, the relative angle of the pulley 26 is adjusted, thereby enabling the pulley 26 to be properly aligned with the belt 28.

Similar to the rear pulley 26, the front pulley 25 includes a horizontally disposed shaft 40 transverse to the belt 28 and rotatably supported by a pulley bearing 41. The bearing 41 is similarly housed and supported by a pillow block 42 adjustably secured to a belt adjustment carriage 44 by a pair of bolts 45,45. Each of the bolts 45 extends through the pillow block 42 and through an elongated opening in the carriage 44. Associated with the pillow block 42 is an adjustment means in the form of a belt adjustment screw 46 and an adjustment screw guide 48 similar in structure and function to the screw 38 and guide 39 previously discussed in connection with the adjustment of the pillow blocks 32. A second pillow block and adjustment means corresponding to the pillow block 42 and adjustment means 46 and 48 are associated with the other end of the shaft 40 and similarly mounted to a corresponding portion of the carriage 44. Like the adjustment means associated with the pulley 26, the adjustment means including the screw 46 and guide 48 serve to adjust the longitudinal position of the pulley 25 and the alignment of that pulley with respect to the belt 28.

As illustrated best in FIG. 1, the carriage 44 is a generally U-shaped member having a pair of elongated leg portions each pivotally secured at their ends to the bottom of the support 18 and to the bottom of the support (not shown) corresponding to the support 18. More specifically, each of the leg members of the carriage 44 is constructed from a hollow metal tubular member having a square cross-section. Connected to an end of each of the leg portions by a weld or other appropriate means is a pair of plates 49, each having a portion extending beyond the end of the leg members. The portions of the plates 49 which extend beyond the leg members are adapted to straddle the support 18 and its corresponding support (not shown), and contain a hole adapted to receive a pin 50 passing through the plates 49 and the supports 18 to pivotally secure the carriage 44 to the supports 18.

Referring again to FIG. 2, the hold down wheel or roller 29 is illustrated as being similar in construction to the pulleys 25 and 26 but significantly larger than either of the pulleys. Specifically, the hold down wheel 29 includes a horizontally disposed shaft 51 rotatably supported by the bearing 52 which in turn is supported and housed by the pillow block 54. the block 54 is mounted to the pulley support bracket 19 via a pair of conventional machine bolts 55. A second pillow block corresponding to the block 54 is positioned on the other end of the shaft 51 and is similarly connected to a second support bracket corresponding to the bracket 19 by a pair of bolts. Unlike the pillow blocks 32 and 42 associated with the pulleys 26 and 25 respectively, the position of the pillow blocks 54 are not adjustable with respect to the support brackets 19. Rather, the wheel 29 is fixedly secured to the bracket 19 in a position between the pulleys 25 and 26 and with a vertical disposition such that the wheel 29 engages the endless belt 28.

Associated with the belt adjustment carriage 44 is a belt adjustment bracket 56 pivotally connected at one end to the carriage 44 via the bolt 58 and adjustably connected near its other end to the support bracket 19 by the bolt 59. The end of the bracket 56 connected to the bracket 19 contains an elongated opening 60 designed to permit the relative position of the bracket 56 and the rotated position of the carriage 44 about the pivot 50 to be adjusted. The bolt 59 includes a handle portion 61 welded to the nut portion of the bolt enabling the bolt 59 to be quickly and easily loosened and tightened.

As a result of adjusting the relative rotational position of the carriage 44, the relative position of the pulley 25 and the angle 62 which the belt 28 makes with the horizontal is also adjusted. As will be discussed in more detail below, the adjustment of the belt angle 62 affects the distance which the fertilizer particles 64 are projected and also affects the distribution pattern of the particles 64. Although the drawings of the preferred embodiment illustrate the belt angle adjustment means as being a manually operated adjustment means which requires the operator to dismount the draft means in order to make the adjustment, it is comtemplated that the angle adjustment could be accomplished hydraulically with a remote control. With such an arrangement, the driver could adjust the angle of elevation 62 without dismounting the draft vehicle.

The endless belt 28 extends around and between the pulleys 25 and 26 and is depressed near its middle by the hold down wheel 29. Its width corresponds substantially to the width of the pulleys 25 and 26 and the hold down wheel 29, and it is constructed from a relatively flexible, but non-extendable material. Although the angle 62 which the belt 28 makes with the horizontal may be adjusted to a number of different angles to vary the distribution pattern of the fertilizer and the distance which the fertilizer is thrown, it has been found through experimentation that the optimum belt angle 62 is in the range of 33° to 45° with an optimum angle of about 35°. The optimum angle of 35° was selected because it gives essentially the same horizontal displacement as the higher angles and has the added advantage that it lowers the particle trajectory, thus reducing the effect of the wind on the particles.

Further illustrated generally in FIG. 2 and more specifically in FIGS. 3 and 4, the fertilizer spreader of the present invention includes an improved deflector means for deflecting and directing the fertilizer particles projected by the aforementioned projecting means over a relatively uniform distribution pattern. The improved deflector means includes a deflector 65 having a plurality of deflecting fingers 66. The deflector 65 is secured to a pair of deflector mounting brackets 68 one of which is positioned on each side of the pulley 25 and securely connected to a forward portion of the pillow blocks 42 via the bolts 45. Accordingly, the mounting brackets 68 and the entire deflector 65 is moveable together with the carriage 44 and the pulley 25 when the belt angle 62 is adjusted. The deflector 65 also includes a shield 69 disposed rearwardly of the fingers 66 to aid in directing the fertilizer particles 64 toward the deflecting fingers 66.

The deflector 65 is made from a ⅛ inch steel plate 70 with seven finger members extending from the plate 70 in a variety of angles. The plate 70 is secured to a metal crosspiece 71 by the bolts 72 which in turn is connected with the mounting brackets 68. As illustrated more clearly in FIG. 4, the deflector 65 is supported immediately above the ribbon-like stream of projected fertilizer particles 64 so that the fingers 66 protrude into the stream at different angles to deflect the fertilizer particles in different directions. In their effort to obtain a desired distribution pattern, the inventors found that the uniformity of the distribution pattern depended on the belt angle 62 (FIG. 2), the slope of the hill on which the fertilizer was spread, the width of the deflecting fingers 66 and the size of the deflection angles. Additionally it was found that the distribution pattern varied with the type and size of fertilizer particles thrown and the width and cross-sectional distribution of the fertilizer ribbon. For example, the center of the fertilizer ribbon usually contained more fertilizer than the edges. Consequently, the design of the deflector fingers, especially the width and deflection angle of the fingers, had to compensate for this nonuniform cross-section.

The inventors have found through the following experimental procedure than an acceptable seven finger deflector for fertilizers such as 0–46–0 and 5–10–10 could be designed which would give a relatively uniform distribution pattern. First of all a number of catching trays were placed at 5 foot intervals for up to 100 feet in depth in two rows approximately 15 feet between rows. Next, a fertilizer spreader of the type described above was equipped with an adjustable deflector which could be easily changed to various sizes of deflector angles, and the belt was brought to a speed of about 10,000 feet per minute. Then two passes were made over the trays and the samples from the trays were collected and weighed to the nearest 0.1 gram. From the data collected, it was found that a fairly uniform distribution pattern could be obtained when the seven deflector fingers 66 which are numbered from 1–7 and schematically illustrated in FIG. 6 were disposed at the approximate angles with respect to the horizontal which are listed in table 1.

| Finger Number | Approximate Angle |
| --- | --- |
| 1 | −22° |
| 2 | 0° |
| 3 | +27° |
| 4 | +33° |
| 5 | +12° |
| 6 | −15° |
| 7 | −45° |

In the above table, angles having a minus sign are angles below the horizontal and angles having a plus sign are angles above the horizontal. It should also be noted that the above experimental tests were made with the belt angle 62 set at 35° and with the belt 28 disposed about 30 inches above the ground. Although the preferred embodiment comtemplates the use of a deflector means to distribute the fertilizer particles into a desired distribution pattern, it is further contemplated that other means for directing the fertilizer into a desired distribution pattern may also be used with the improved projecting means previously discussed.

In FIG. 5 an alternative embodiment of the present invention is illustrated. This embodiment is capable of throwing fertilizer to either side of the spreader 73 and includes a pair of end pulleys 74 and 78, a pair of combination pulley and hold down wheels or rollers 75 and 76, and a pair of endless belts 79 and 80 extending around and between the pulleys 75 and 78 and the pulleys 74 and 76 respectively. Although not specifically illustrated, each of the end pulleys 74 and 78 are intended to be adjustably mounted to a pivotable carriage by a pair of bearings and a pair of pillow blocks similar to the connection between the pulley 25 and the carriage 44 of FIG. 2. Associated with each of these carriages is a belt adjustment means similar to the means 56 of FIG. 2 enabling the rotational position of the carriages, the height of the pulleys 74 and 78, and the discharge angle of the belts 80 and 79 to be adjusted.

Unlike the pulleys 74 and 78, each of the combination pulley and hold down wheels 75 and 76 is rigidly and unmoveably secured to a portion of the spreader frame (not shown) by a pair of bearings and pillow blocks similar to the securement of the wheel 29 to the bracket 19 in FIG. 2. As illustrated, one half of the member 75 serves as a pulley for the belt 79 while the other half serves as a hold down wheel for the belt 80. Similarly, one half of the member 76 serves as a pulley for the belt 80 while the other half serves as a hold down wheel for the belt 79. During operation, fertilizer is fed via the auger 43 into the area between the pulleys 75 and 76 so that a portion of the fertilizer is caused to pass between the belt 79 and the pulley 76 and a portion is caused to pass between the belt 80 and the pulley 75. With this arrangement fertilizer particles are projected outwardly from the spreader 73 in two directions. Further, although not specifically illustrated, a deflector means similar to the deflector 65 (FIG. 2) is intended to be mounted above each of the pulleys 74 and 78 to intersect the stream of fertilizer particles and deflect those particles over a relatively uniform distribution pattern.

Although the description of the structure of the preferred embodiment has been quite specific, it is contemplated that other embodiments could be built without deviating from the spirit of the present invention. Consequently, the specification is intended to be illustrative only with the scope of the present invention dectated by the appended claims.

We claim:

1. An improved fertilizer spreader for speading particulate fertilizer comprising:
   a fertilizer projecting means for projecting the fertilizer particles including a pair of rotatable pulleys, an endless belt extending around and between said pulleys, a rotatable roller means disposed between said pulleys and engaging said belt for imparting movement to and projecting the particles of fertilizer outwardly from the spreader, and means for rotating said pulleys and said roller means; and
   a deflector means positioned in the stream of the projected fertilizer particles, said deflector means having deflector portions for deflecting various portions of the projected fertilizer particles to achieve a relatively uniform distribution pattern.

2. The improved fertilizer spreader of claim 1 wherein said deflector means includes a plurality of deflecting fingers connected with said projecting means and disposed to intersect said projected fertilizer particles.

3. The improved fertilizer spreader of claim 2 wherein said deflecting fingers are disposed at various angles with respect to the horizontal.

4. The improved fertilizer spreader of claim 3 wherein said deflector means includes seven deflecting fingers.

5. The improved fertilizer spreader of claim 4 wherein the seven deflecting fingers are disposed at different angles with respect to the projected fertilizer to thus deflect the projected particles at different angles.

6. The improved fertilizer spreader of claim 5 wherein the seven deflecting fingers are disposed at the following approximate angles with respect to the horizontal: $-45°$; $-22°$; $-15°$; $0°$; $+12°$; $+27°$; and $+33°$.

7. The improved fertilizer spreader of claim 1 having belt adjustment means for adjusting the angle which said endless belt makes with the horizontal.

8. The improved fertilizer spreader of claim 7 wherein said belt adjustment means is adjusted to dispose said endless belt at an angle of about $35°$ with respect to the horizontal.

9. The improved fertilizer spreader of claim 1 having a second projecting means including a second pair of rotatable pulleys, a second endless belt extending around and between said second pulleys, and a second rotatable roller means disposed between said second pulleys and engaging said second belt for imparting movement to and projecting the particles of fertilizer outwardly from the spreader in a direction substantially opposite to that of said first projecting means.

10. The improved fertilizer spreader of claim 9 wherein said first roller means serves also as one of said second pulleys and wherein said second roller means serves also as one of said first pulleys.

11. An improved fertilizer spreader for spreading particulate fertilizer comprising:
    a pair of rotatable pulleys;
    an endless belt having a width substantially equal to the width of said pulleys extending around and between said pulleys;
    a rotatable roller means disposed between said pulleys and engaging said belt for imparting movement to and projecting the particles of fertilizer outwardly from the spreader;
    means for rotating said pulleys and said roller means;
    means for adjusting the angle which the belt makes with the horizontal thus changing the projection angle of the projected fertilizer particles; and
    deflector means intersecting the path of the projected fertilizer particles for distributing said particles uniformly over a relatively wide area.

12. The improved fertilizer spreader of claim 11 wherein the position of said deflector means with respect to the path of projected fertilizer particles remains constant despite the adjustment of the projection angle of the projected fertilizer particles.

13. The improved fertilizer spreader of claim 12 wherein said deflector means includes a plurality of fingers intersecting the projected fertilizer particles.

* * * * *